United States Patent [19]

Mishkin et al.

[11] Patent Number: 5,512,308
[45] Date of Patent: Apr. 30, 1996

[54] PREPARATION OF FRUIT AND NUT MIXES WITH IMPROVED TEXTURE AND TEXTURE STABILITY

[75] Inventors: Martin A. Mishkin, Loveland; Maria D. Villagran, West Chester; Yen C. Hsieh, Cincinnati; Stephen P. Zimmerman, Wyoming, all of Ohio

[73] Assignee: John B. Sanfilippo & Son, Inc., Elk Grove Village, Ill.

[21] Appl. No.: 178,705

[22] Filed: Jan. 10, 1994

Related U.S. Application Data

[63] Continuation-in-part of Ser. No. 48,540, Apr. 14, 1993, abandoned.

[51] Int. Cl.[6] .................................................. A23G 3/00
[52] U.S. Cl. ........................ 426/93; 426/103; 426/632
[58] Field of Search ............................ 428/93, 103, 632

[56] References Cited

U.S. PATENT DOCUMENTS

| | | | |
|---|---|---|---|
| 4,256,772 | 3/1981 | Shanbhag et al. | 426/331 |
| 4,451,488 | 5/1984 | Cook et al. | 426/89 |
| 4,455,333 | 6/1984 | Hong et al. | 426/94 |
| 4,522,833 | 6/1985 | Sharma | 426/93 |
| 4,605,561 | 8/1986 | Lang | 426/93 |
| 4,744,995 | 5/1988 | Robinson | 426/632 |
| 4,784,867 | 11/1988 | LaBaw et al. | 426/632 |
| 4,828,858 | 5/1989 | Holloway, Jr. et al. | 426/293 |
| 4,888,187 | 12/1989 | Given, Jr. et al. | 416/102 |
| 5,000,971 | 3/1991 | Hsieh et al. | 426/302 |
| 5,194,278 | 3/1993 | Strong | 426/293 |

FOREIGN PATENT DOCUMENTS

| | | | |
|---|---|---|---|
| 9213993 | 10/1992 | Australia | A23B 7/02 |
| 1021990 | 12/1977 | Canada | 99/136 |

OTHER PUBLICATIONS

Family Circle, 1972, Rockville House Publishers, Inc., Rockville Center, N.Y. p. 1404.

Hong, Y. C. et al.; "Finite Element Modeling of Moisture Transfer During Storage of Mixed Multicomponent Dried Foods"; *Journal of Food Science;* vol. 51, (Mar.), 1986; pp. 554–558.

*Primary Examiner*—Helen Pratt
*Attorney, Agent, or Firm*—Jenner & Block

[57] ABSTRACT

Disclosed is the preparation of fruit and nut mixes with improved texture stability. Such mixes contain from about 15% to about 60% fruit and from about 40% to about 85% nuts wherein at least about 20% of the nuts are roasted and at least about 20% of the nuts have a crystalline sugar coating. The fruit for use in the mix has an initial water activity of from about 0.35 to about 0.70 and an initial moisture content of from about 7% to about 18% water. The roasted nuts for use in the mix have an initial water activity of from about 0.05 to about 0.40 and an initial moisture content of up to about 3% water. Once the fruit and nuts are combined, they are allowed to equilibrate in a moisture impervious environment to an equilibrium water activity of from about 0.35 to about 0.58 and a percent moisture to equilibrium water activity ratio of the fruit of from about 17:1 to about 32:1.

14 Claims, No Drawings

PREPARATION OF FRUIT AND NUT MIXES WITH IMPROVED TEXTURE AND TEXTURE STABILITY

RELATED APPLICATION

This is a continuation-in-part of application Ser. No. 048,540, filed Apr. 14, 1993, now abandoned.

FIELD OF THE INVENTION

This invention relates to the preparation of fruit and nut mixes with improved texture and texture stability.

BACKGROUND OF THE INVENTION

Trail mixes have become popular as nutritious and convenient snacks for an increasingly health conscious consumer. These mixes typically contain nuts and dried fruit in combination with other food particulates (e.g., seeds, chocolate, carob, yogurt, sugars, etc.). Trail mixes typically contain not more than about 20% moisture, more typically from about 5 to 15% moisture. This low moisture characteristic helps to maintain the microbial and to some extent the chemical stability of trail mix products. Accordingly, such low moisture characteristics help provide for a product with a commercially viable shelf life.

Trail mixes containing dried fruits and nuts, however, are often described as having undesirable textural characteristics. In particular, the dried fruits in such mixes normally have a tough fibrous texture due to their low moisture content. The nuts in such mixes often have a rubbery texture which lacks sufficient crunchiness. This rubbery texture is due primarily to the excess moisture that has migrated into the nuts from the surrounding dried fruit.

There have been a few attempts to improve the texture of trail mixes containing nuts and dried fruit. One such attempt is to mix raw or freshly roasted nuts with intermediate moisture fruit. Immediately after mixing, the nuts have a crunchy texture while the intermediate moisture fruits have a tender texture. Over several days, however, the intermediate moisture fruit loses moisture to the nuts. The texture of the fruit soon becomes tough and fibrous as the texture of the nuts becomes rubbery.

Another attempt to improve the texture of dried fruit products is to infuse dried fruit with humectants. This approach is commonly used to make fruit-containing breakfast cereals. The infused humectants decrease the water activity of the fruits thereby inhibiting moisture migration from the dried fruit to any surrounding drier material (e.g., cereal flakes) since the humectant binds the water in the fruit. Moreover, the infused fruit can contain even more moisture which results in a more tender fruit texture. Humectants commonly used in dried fruit include sugars (e.g., dextrose, sucrose) and polyhydric alcohols (e.g., glycerol, sorbitol, mannitol). However, the use of such humectants in high concentrations in trail mix products is not desirable. High concentrations of humectants, especially polyhydric alcohols, can cause a throat burning sensation when used at sufficient concentrations. This sensation is not readily apparent in breakfast cereals where only small amounts of infused fruit are used and any burning sensation is masked by the use of milk on the breakfast cereal. Of course, trail mixes are not commonly used with milk and they typically contain much more fruit than breakfast cereals. The use of high concentrations of humectants also tends to mask the natural flavor of the dried fruit by contributing artificial, excessively sweet, or off flavors.

Another attempt to improve the texture of dried fruit products is to coat or dust the dried fruit with moisture binders such as finely ground modified or native starches, pregelatinized starches, cellulosics, modified cellulosics and like materials. The fruit surface can also be dusted with crystalline solids such as maltose, lactose, dextrose and sucrose. While these moisture binders help to retain the moisture in the dried fruit, their ability to do so is very limited. Consequently, they are not commonly relied upon as the sole means for retaining moisture within dried fruit.

Accordingly, there is a continuing need to provide trail mix products which have improved texture and texture stability. Specifically, there is a need to provide fruit and nut mixes wherein the fruits are tender, the nuts are crunchy, and these textural characteristics remain for prolonged periods at ambient temperatures.

SUMMARY OF THE INVENTION

In its process aspects, the present invention relates to a process for making fruit and nut mixes with improved texture and texture stability. Such a process involves providing fruit with an initial water activity of from about 0.35 to about 0.70 and an initial moisture content of from about 7% to about 18% water, and also providing nuts wherein at least about 20% are roasted and at least about 20% have a substantially crystalline sugar coating. The roasted nuts have a water activity of from about 0.05 to about 0.40 and a moisture content of up to about 3% water. The fruit and nuts are mixed such that the resulting mixture comprises from about 40% to about 85% nuts and from about 15% to about 60% fruits. The mixture is equilibrated in a moisture impervious environment to an equilibrium water activity of from about 0.35 to about 0.58. The percent moisture to equilibrium water activity ratio of the fruit in the equilibrated mix is from about 17:1 to about 32:1.

In its product aspects, the present invention relates to fruit and nut mixes comprising from about 15% to about 60% fruit and from about 40% to about 85% nuts wherein at least about 20% of the nuts are roasted and at least about 20% of the nuts have a substantially crystalline sugar coating. The fruit and nut mix has an equilibrium water activity of from about 0.35 to about 0.58 and a percent moisture to equilibrium water activity ratio of the fruit of from about 17:1 to about 32:1.

DETAILED DESCRIPTION OF THE INVENTION

The improved texture and texture stability of the fruit and nut mix are due primarily to the surprisingly successful employment of the water profile described hereinafter for the mix. This water profile is made possible by controlling initial water activities, initial moisture levels, and weight percentages of fruits and nuts in the mixture described herein. To a lesser extent, the water profile of the mix is also made possible by the employment of substantially crystalline sugar coatings on at least about 20% of the nuts.

As used herein, "water profile" refers to the water activity (Aw) and moisture levels of a material. Water profiles can also be characterized as the ratio of the percent moisture to equilibrium water activity of a material.

As used herein, "initial" water activity and moisture content refer to the water activity and moisture content of fruits and nuts immediately before incorporating them into the fruit and nut mix of the present invention.

As used herein, "texture stability" refers to the characteristic of the fruit and nut mix wherein the improved tender texture of the fruit and the improved crunchy texture of the nuts are maintained for at least about 6 months at ambient temperatures in a substantially moisture impervious environment.

As used herein, all ratios and percentages are based on weight unless otherwise specified.

The preparation of the fruit and nut mix of the present invention is described in detail as follows.

A. Fruit

The fruit and nut mix of the present invention contains a percentage of fruit having an initial water profile characterized in terms of initial moisture content and initial water activity. Once incorporated into the mix, the fruit is characterized by its percent moisture to equilibrium water activity ratio described hereinafter.

Specifically, the fruit and nut mix comprises from about 15% to about 60%, preferably from about 20% to about 45% fruit. Fruits selected for use in the mix must have an initial water activity of from about 0.35 to about 0.7, preferably from about 0.45 to about 0.60, and an initial moisture content of from about 7% to about 18% water, preferably from about 9% to about 13% water. Water activity values are commonly used in the food sciences and represent the pure unitless ratio of the equilibrium vapor pressure of water above a material to the vapor pressure of pure water at the same temperature. For purposes of the present invention, such vapor pressures are measured at ambient temperatures (about 70° F.). As an example, a dried fruit might have a water activity value of 0.45 at 70° F. This means that the water equilibrium vapor pressure above the dried fruit is 45% that of the water vapor pressure above pure liquid water at 70° F.

Fruits suitable for use herein can be prepared or obtained by known or conventional methods provided that the fruit exhibits the requisite water profiles. For example, the fruit can be treated with humectants if desired to help achieve the requisite initial water activity of the fruit. However, the humectant concentrations needed to achieve the desired moisture profile should be below the concentrations which would result in off flavor. The fruit can be added to the mix as whole fruit or pieces thereof. Suitable fruits or like materials for use in the mix include papaya, raisins, currants, dates, figs, apples, bananas, pears, peaches, pineapple, oranges, coconuts, cranberries, cherries, apricots and blends thereof. Preferably, the fruits comprise papaya, pineapple, raisins, cranberries, coconuts, dates, figs or blends thereof.

Optionally, fruit selected for use in the fruit and nut mix can also be treated with plasticizers, carbohydrate sweeteners, flavorants, emulsifiers, humectants, colorants and processing aids. Such treatments, for example, can involve the use of glycerol, sorbitol, maltose, glucose, fructose, sucrose, invert sugars, carbohydrate or sugar syrups (e.g., corn syrups, honey, molasses, malt syrup, sucrose syrup ) and other similar functioning materials. The fruit can also be coated or dusted with moisture binders. Moisture binders include, for example, finely ground native or modified starches, pregelatinized starches, bran, cellulosics and modified cellulosics. The fruit surface can also be dusted with crystalline solids such as crystalline mono- or disaccharides and other similar functioning materials. Whether any of these optional treatments of the fruit are employed, it is important that the water profile of the fruit and the fruit and nut mix at equilibrium remains within the narrow ranges described hereinafter.

B. Nuts

The fruit and nut mix of the present invention contains a percentage of nuts wherein at least about 20% are roasted and have a selected water profile, and at least about 20% have a substantially crystalline sugar coating.

Specifically, the fruit and nut mix of the present invention comprises from about 40% to about 85%, preferably from about 55% to about 80% nuts, wherein at least about 20%, preferably at least about 50% of the nuts are roasted. The roasted nuts must have an initial water activity of from about 0.05 to about 0.40, preferably from about 0.10 to about 0.30, and an initial moisture content of up to about 3% water, preferably from about 0.5% to about 2% water.

Some of the nuts selected for use in the mix have a substantially crystalline sugar coating. Specifically, at least about 20%, preferably from about 30% to about 90% of the nuts have a substantially crystalline sugar coating. "Substantially crystalline" as used herein means that at least about 50%, preferably from about 50% to about 80% of the sugar in the nut coating is in a crystalline rather than an amorphous form. Sugars suitable for use in the substantially crystalline sugar coating include those that will remain at least about 50% crystallized when exposed to the fruit and nut mix. Such suitable sugars include sucrose, dextrose, fructose, lactose, maltose and mixtures thereof. Sucrose is the most preferred sugar because of its crystalline properties. These sugars may be used in combination with noncrystallizing sugars (e.g., invert sugar, sugar in corn syrups) so long as at least about 50% of the sugar in the nut coating is in crystalline form.

The substantially crystalline sugar coating on the nuts provides two major benefits. First, the coating increases the maximum allowable water activity range at which the fruit and nut mix still exhibits an improved texture and texture stability. At these higher water activity levels, the crunchy texture of the coating in effect compensates for any reduced crunchiness of the nuts lost due to their higher water activities. At lower water activity levels, this crunchy crystalline sugar coating augments the crunchy texture of the nuts. Secondly, the crystalline sugar coating helps reduce stickiness of the nuts within the water activity ranges described hereinafter for the fruit and nut mixture.

It has also been found that the crystalline sugar coating imparts a greater textural benefit to almonds, pecans and peanuts than other nut varieties. Accordingly, any almonds, pecans or peanuts in the fruit and nut mix are preferably coated in a substantially crystalline sugar material.

Nuts suitable for use herein can be obtained or prepared by known or conventional methods provided that the nuts exhibit the requisite characteristics. These nuts can be incorporated into the fruit and nut mix as whole nuts or pieces thereof. Suitable nuts for use in the fruit and nut mix include almonds, macadamia nuts, Brazil nuts, cashews, filberts, peanuts, pecans, walnuts and blends thereof. Preferably, the nuts comprise walnuts, almonds, cashews, pecans, peanuts or blends thereof.

Optionally, the nuts can be coated with chocolate, chocolate substitutes, yogurt, or other confectionery coatings.

C. Fruit and Nut Mix

The fruit and nut mix of the present invention exhibits an improved texture and texture stability. That is, the improved tender texture of the fruit and the improved crunchy texture of the nuts remain for prolonged periods at ambient temperatures when maintained in a moisture impervious environment.

Once the fruits and nuts as described herein are combined in the desired amounts, the resulting fruit and nut mix is allowed to equilibrate in a moisture impervious environment to an equilibrium water activity of from about 0.35 to about 0.58, preferably from about 0.40 to about 0.55, and a percent moisture to equilibrium water activity ratio of the fruit in the equilibrated mix of from about 17:1 to about 32:1, preferably from about 20:1 to about 26:1. At ambient temperatures, such equilibration typically requires about seven days. The actual time can vary from about 2 to 14 days depending on the temperature conditions and initial moisture levels.

The equilibrated mix is then maintained in a moisture impervious environment until consumption. Suitable packages for use in maintaining such an environment are those wherein the water activity of the equilibrated fruit and nut mix therein does not shift by more than about 0.2 over at least about 6 months when maintained in the presence of a 5–95% relative humidity at ambient temperatures. Examples of such suitable packages include hermetically and vacuum sealed packages, e.g. glass jars, aluminum foil packages, metal cans, and air and moisture impervious plastics.

It has been found that the fruit and nut mix as described herein exhibits an improved texture and texture stability relative to conventional or currently marketed trail mix products. Although some conventional trail mix products typically contain the same fruit/nut ratios and water activities as that of the present invention, the conventional mixes contain fruit which have a lower percent moisture to equilibrium water activity (about 15:1). With such a water profile, the fruit in the conventional mixes are typically tough and fibrous. In the case of fruit-containing breakfast cereals, the percent moisture to equilibrium water activity of the fruit is typically greater than about 50 to provide quick hydration in milk. Unlike conventional trail mixes or the fruit-containing breakfast cereals, the fruit and nut mix of the present invention contains fruit having a percent moisture to equilibrium water activity of from about 17:1 to about 32:1. In this fruit and nut mix, both fruit tenderness and nut crunchiness are maintained at optimal levels for prolonged periods. Such prolonged periods are typically from about 6 to about 24 months, more typically from about 12 to about 24 months.

Preferably, the fruit and nut mix, if not vacuum packaged, is packed under nitrogen to prevent oxidation of the fats in the nuts. Antioxidants can also be included in the fruit and nut mix for this same purpose.

EXAMPLES

The fruit and nut mixes of the present invention are illustrated by the following examples.

Example I

A fruit and nut mix is prepared which comprises about 70% nuts and about 30% fruit. The fruit and nut mix so prepared is described below.

| Ingredient | Amount (%) | Initial Moisture Content (%) | Initial Water Activity |
|---|---|---|---|
| Cashews | 20 | 1.3 | 0.24 |
| Coated Almonds | 25 | 1.9 | 0.17 |
| Coated Peanuts | 25 | 1.3 | 0.14 |
| Pineapple | 15 | 11 | 0.46 |
| Papaya | 15 | 13 | 0.61 |

The nuts used in the mix are roasted nuts. The almond and peanut coatings comprise sucrose wherein about 50% is in a crystalline form. The pineapple and papaya have been soaked in a 65% sucrose syrup and then dehydrated resulting in the moisture profiles indicated above.

Immediately after combining the above listed fruits and nuts, 354 gram amounts of the mix are packed under nitrogen into 770 cc metal packages. After about seven days, the equilibrium water activity of the packaged mix is 0.53 and the percent moisture to equilibrium water activity ratio of the fruit is 24.5:1.

Example 2

A fruit and nut mix is prepared which comprises about 72% nuts and about 28% fruit. The fruit and nut mix so prepared is described below.

| Ingredient | Amount (%) | Initial Moisture Content (%) | Initial Water Activity |
|---|---|---|---|
| Cashews | 14 | 1.3 | 0.24 |
| Walnuts | 25 | 1.1 | 0.15 |
| Coated Peanuts | 33 | 1.3 | 0.14 |
| Raisins | 18 | 13 | 0.54 |
| Cranberries | 10 | 10.8 | 0.39 |

The nuts in the mix are roasted nuts. The peanut coating comprises sucrose wherein about 50% is in a crystalline form. The raisins and cranberries have been soaked in a 65% sucrose syrup and then dehydrated resulting in the moisture profiles indicated above.

Immediately after combining the above listed fruits and nuts, 354 gram amounts of the mix are packed under nitrogen into 770 cc metal packages. After about seven days, the equilibrium water activity of the packaged mix is 0.55 and the percent moisture to equilibrium water activity ratio of the fruit is 26:1.

The shelf life of the packaged products in EXAMPLES 1 and 2 is about 6 months. During this shelf life, the fruit maintains a tender texture while the nuts maintain a crunchy texture.

What is claimed is:

1. A fruit and nut mix having an improved texture and texture stability, comprising:
   a) from about 40% to about 85% nuts wherein at least about 20% of the nuts are roasted and at least about 20% of the nuts have substantially crystalline sugar coating and
   b) from about 15% to about 60% fruit, wherein the fruit and nut mix has an equilibrium water activity of from about 0.35 to about 0.58 and a percent moisture to equilibrium water activity ratio of the fruit of from about 17:1 to about 32:1.

2. The fruit and nut mix according to claim 1 wherein the resulting fruit and nut mix is contained within a substantially moisture impervious environment.

3. The fruit and nut mix according to claim 1 wherein the mix comprises from about 55% to about 80% nuts and from about 20% to about 45% fruit.

4. The fruit and nut mix according to claim 1 wherein at least about 50% of the nuts are roasted.

5. The fruit and nut mix according to claim 1 wherein the equilibrium water activity of the mix is from about 0.40 to about 0.55 and the percent moisture to equilibrium water activity ratio of the fruit is from about 20:1 to about 26:1.

6. The fruit and nut mix according to claim I wherein the fruit is selected from the group consisting of papaya, pineapple, raisins, cranberries, coconuts, dates, figs and blends thereof.

7. The fruit and nut mix according to claim 1 wherein the nuts are selected from the group consisting of cashews, peanuts, walnuts, pecans, almonds and blends thereof.

8. The fruit and nut mix according to claim 1 wherein from about 30% to about 90% of the nuts have a substantially crystalline sucrose coating.

9. A process of making a fruit and nut mix having an improved texture and texture stability, which process comprises the steps of:
   a) admixing fruit and nuts to make a fruit-nut mixture comprising
      i) from about 15% to about 60% fruit having an initial water activity of from about 0.35 to about 0.70 and an initial moisture content of from about 7% to about 18% water,
      ii) from about 40% to about 85% nuts, wherein at least about 20% of the nuts are roasted and at least about 20% have a substantially crystalline sugar coating, and wherein the roasted nuts have an initial water activity of from about 0.05 to about 0.40 and an initial moisture content of up to about 3% water; and
   b) equilibrating the fruit and nut mix in a substantially moisture impervious environment to an equilibrium water activity of from about 0.35 to about 0.58 and a percent moisture to equilibrium water activity ratio of the fruit of from about 17:1 to about 32:1.

10. The process according to claim 9 wherein the fruit has an initial water activity of from about 0.45 to about 0.60 and an initial moisture content of from about 9% to about 13% water, wherein at least about 50% of the nuts are roasted and have an initial water activity of from about 0.10 to about 0.30 and an initial moisture content of from about 0.5% to about 2% water, and wherein the fruit and nut mix is equilibrated to an equilibrium water activity of from about 0.40 to about 0.55 and a percent moisture to equilibrium water activity ratio of the fruit of from about 20:1 to about 26:1.

11. The process according to claim 10 wherein the mix comprises from about 55% to about 80% nuts and from about 20% to about 45% of fruit.

12. The process according to claim 9 wherein the fruit is selected from the group consisting of papaya, pineapple, raisins, cranberries, coconuts, dates, figs and blends thereof.

13. The process according to claim 9 wherein the nuts are selected from the group consisting of cashews, peanuts, walnuts, pecans, almonds and blends thereof.

14. The process according to claim 9 wherein from about 30% to about 90% of the nuts have a substantially crystalline sucrose coating.

\* \* \* \* \*